Oct. 15, 1957  G. O. ORTH, JR  2,809,949
POLYVINYL ACETATE AQUEOUS DISPERSION CONTAINING A BORATE
Filed June 28, 1954

INVENTOR.
George Otto Orth, Jr.
BY ECKHOFF & SLICK, Attys.

A member of the firm.

United States Patent Office 2,809,949
Patented Oct. 15, 1957

2,809,949

POLYVINYL ACETATE AQUEOUS DISPERSION CONTAINING A BORATE

George Otto Orth, Jr., Seattle, Wash., assignor to American Potash & Chemical Corporation, a corporation of Delaware Application June 28, 1954, Serial No. 439,745

1 Claim. (Cl. 260—29.6)

This invention relates to coating compositions having improved fire resistance and particularly to imparting improved fire resistance to water-base paints.

The use of borates to impart fire resistance in various coating compositions has long been known. However, because such borates are water soluble, a composition including a borate has such low resistance to moisture that the coating cannot be exposed to weather, nor can it be washed without damage. In accordance with the present invention, I provide a borate composition which can be used successfully in water-based coating compositions to impart increased fire resistance and which does not detract from the utility of the composition, e. g., the coating can be washed without deleterious effect.

I have found that if one uses a borate composition having a $B_2O_3$ to $Na_2O$ ratio of between about 4 and about 5 to 1 on a weight basis, the resulting composition has greatly improved fire resistance and, in addition, is not susceptible to damage by moisture even under conditions far more severe than those encountered in any normal use. Such borate compositions are weakly alkaline; in a 10% by weight water solution, they will have a pH between about 7 and about 8 at 25° C.; the preferred borate composition has a $B_2O_3$–$Na_2O$ ratio of 4.8 to 1 and a pH of about 7.7 in a 10% by weight water solution at 25° C. These compositions are readily prepared by mixing boric oxide and sodium oxide in suitable proportions or by mixing suitable sodium and borate containing salts, as is taught in the Suhr patent, 2,096,266 of October, 1937; for example, a borate composition having a $B_2O_3$–$Na_2O$ ratio of 5-to-1 corresponds to the compound $Na_2B_{10}O_{16}$, disclosed by Suhr.

It is in general the broad object of the present invention to provide an improved water-based coating composition including a borate composition and having improved fire resistance properties.

Another object of the present invention is to provide a water-base coating composition including a borate composition which provides a surface having improved fire resistance and which surface can be washed without harm under conditions of normal use.

Figure 1:
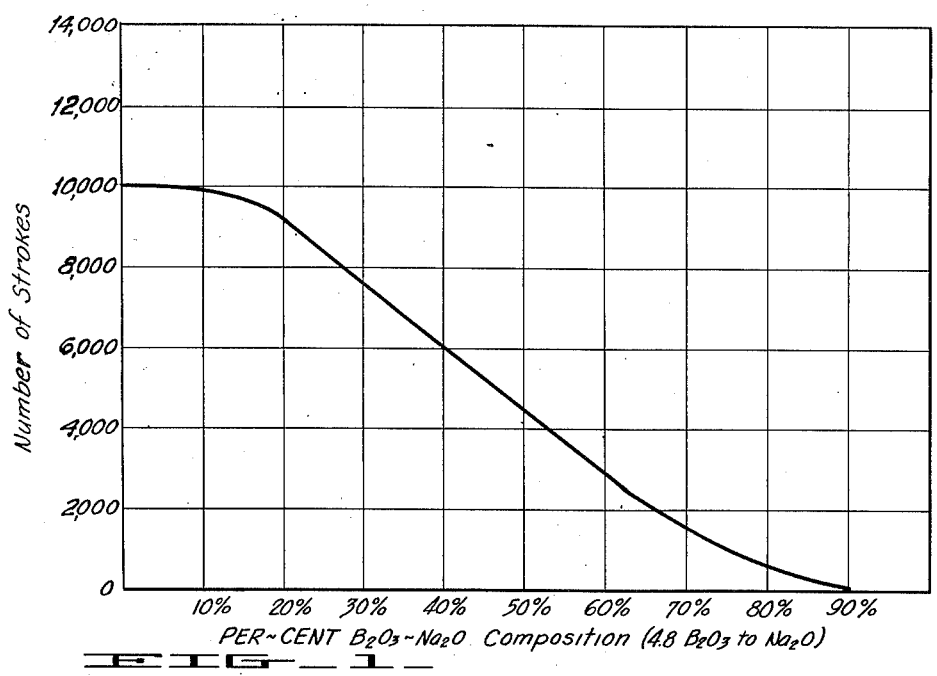
Figure 2:
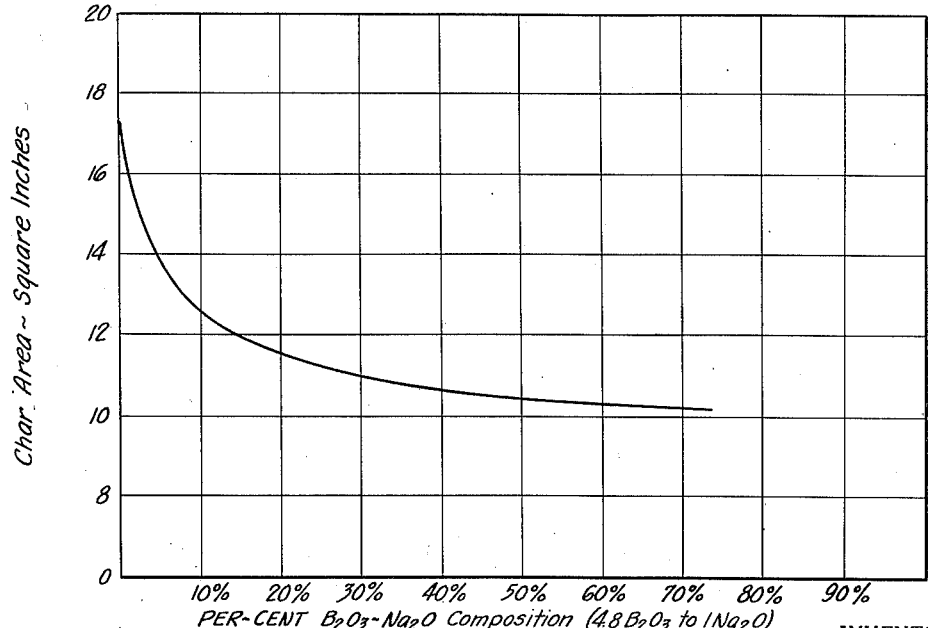

The invention includes other objects and features of advantage, some of which, together with the foregoing, will appear hereinafter wherein the present preferred form of coating composition is disclosed. In the drawing accompanying and forming a part hereof are included Figures 1 and 2, respectively graphical showings of washing and char tests of compositions embodying the present invention.

To demonstrate the utility of the compositions of this invention, a typical water-base paint was made up as follows (the proportions are by weight):

Liquid portion:
    780 polyvinyl acetate, 55% total solids
    1170 water
Pigment portion:
    126 titanium dioxide pigment
    86 diatomaceous earth
    210 coating grade clay
    340 lithopone
    86 mica.

One should use a polyvinyl acetate dispersion having a low polyvinyl alcohol content, e. g., less than 5%. Also, the dispersing agent should be compatible with the borate composition; if the dispersing agent is not compatible, the borate breaks the dispersion and may cause the polyvinyl acetate to coagulate. As suitable polyvinyl acetate dispersions, I have used those marketed under the following trade-marks by the purveyor indicated:

| | |
|---|---|
| Bakelite | WC–130. |
| National Starch | 11–K–22. |
| Shawinigan | TS–22. |
| Shawinigan | TS–30. |
| Dewey & Almy | 86289. |
| Alkydol Products | Alk-O-Mer 8022. |

A portion of the liquid was mixed with the pigment and ground, following which the balance of the liquid portion was added. To equal portions of the above paint composition, increments of a borate composition embodying this invention (having a $B_2O_3$–$Na_2O$ ratio of 4.8) were added in amounts corresponding to increments of 10% based on the total resin solids from 10% to 100%; that is, the paint formulation given above includes 429 parts by weight up to a total of 429 parts, corresponding to increments of 10% from 10% to 100% of resin solids. In those formulations corresponding to 80, 90, and 100 percent of the borate composition based on the resin solids, the addition of further water was necessary to dissolve the borate. Each of the so-prepared eleven compositions was then sprayed at the rate of about 20 pounds of contained solids per 1,000 board feet over primed and unprimed hard board, primed and unprimed soft board, and on ground glass.

After the lapse of sufficient time to permit of thorough drying, the respective panels were subjected to test in a Gardner wash test machine. This is a device which is well-known in the art and which includes a rectangular brush device adapted to be drawn back and forth mechanically over the face of a painted panel, the travel of the brush in each direction being thirteen inches. The brush used had an area of 5.25 inches and a total weight of one pound. It was drawn over the panel at the rate of thirty-seven complete oscillations per minute, the surface of the brush and of the panel being kept wet by application of a 0.5% Ivory soap solution. A counter was provided to count the number of strokes and each test was discontinued when the film surface on the panel was broken. The specifications drawn around the use of this machine ordinarily require that the panel surface be unbroken after 300 complete strokes (see Federal Specification TTP–88a), and this is considered satisfactory. The results of this test are shown graphically in Figure 1. From these, it will be apparent that the use of the borate composition of this invention in a water-base paint does not markedly reduce water resistance until the composition is present in an amount in excess of 50% of the resin solid content.

To illustrate the effectiveness of the borate composition of this invention in reducing char, softboard panels were prepared with each of the eleven paint formulations set forth above and in accordance with U. S. Department of Commerce Specification CS–42–49. The panels were then tested in accordance with this specification, the results being shown graphically in Figure 2. From this, it will be noted that the presence of from 15% to 70% of the preferred borate composition will provide a surface having less than twelve square inches of char, the accepted test limit. The preferred quantity of the borate is from 15% to 70% of the resin solids with a more preferred range of from 40% to 60%.

The composition was also applied to drilled acoustical cellulose units, each one-half inch thick, one foot square, and of 18 pounds per cubic foot density, at the rate of about ten pounds of solids per 1,000 square feet; one group contained 50% by weight of contained resin solids of the preferred borate composition, and the other group 70% by weight. These units were then subjected to the test outlined in Federal Specification SSA-118a. In this test, nine of the like coated units are assembled on a flat support and are subjected to a standard burner blast in which the edge flame temperature application follows the rate curve prescribed in the test and which attains a value of 800° C. after twenty minutes. After the specified twenty-minute burn period, the results on both groups of units were considered satisfactory by an impartial referee laboratory.

The water-base paint formulation set forth above is merely typical and those skilled in the art can readily make variations without departing from this invention, the essential being to incorporate sufficient of the borate composition of this invention as will impart the desired degree of fire resistance to the water-base coating composition. The borate composition can be added to the coating composition as has been disclosed hereinbefore, or it can be incorporated in the binder composition, e. g., the borate can be included in the polyvinyl acetate binder composition by the manufacturer. Also in such formulations, the resin solid content provided by the polyvinyl acetate can be replaced in whole or in part with other resinous materials, as is well-known in the art, such materials being styrene-butadiene, vinyl chloride, acrylic resins, alkyd resins and other resinous or resin-like materials, as well as non-resinous binders such as starch, proteins and other binder materials, which are known to be useful in water-base compositions. In this last connection, however, it must be pointed out that there is a distinct advantage in using the borate compositions of this invention in protective water-base coatings containing a polyvinyl acetate resin. I have found that the presence of the borate composition reduces the rate of flame spread and prevents fire from flashing over the surface of a material coated with the composition. I believe this is because the polyvinyl acetate, in the presence of the borate composition, changes from a thermoplastic material to a non-thermoplastic material, the latter having a higher melting point than its decomposition point. Thus, the polyvinyl acetate-borate composition mixture results in a material which will char before it will burn and so prevents the flashing of a flame across a surface coated with the composition embodying the present invention. I have not found this to be as pronounced with other resins.

Irrespective of the binder material present, however, the heat application causes the $B_2O_3$ content of the coating composition to act as a flux with the pigment portion present and form a ceramic film of relatively low melting point on the surface to which the coating composition has been applied.

This is advantageous, for example, on a celllulose-containing material because such a film prevents gasification upon heat application and so acts as a gas barrier and thus reduces charring of the material and subsequent burning. In any case, the water-base coating compositions of this invention are highly effective even when the composition is applied in the form of a thin film for their utility is not a function of coating thickness.

I claim:

A polyvinyl acetate-water dispersion including from about 15% to 70% on the weight of the polyvinyl acetate present of a borate composition having a $B_2O_3$ to $Na_2O$ ratio of between about 4 and about 5 to 1 on a weight ratio and characterized by resistance to the effects of fire and moisture following application.

References Cited in the file of this patent
UNITED STATES PATENTS

| | | |
|---|---|---|
| 2,385,580 | Knox | Sept. 25, 1945 |
| 2,443,566 | Loveland | June 15, 1948 |
| 2,536,018 | Schoenholz et al. | Jan. 2, 1951 |
| 2,704,243 | Seibert | Mar. 15, 1955 |